United States Patent [19]
Beasley

[11] 4,226,551
[45] Oct. 7, 1980

[54] CONNECTOR SYSTEM FOR ELONGATE MEMBERS

[76] Inventor: Harry Beasley, 164 Maidenway Rd., Paignton, Devon, England

[21] Appl. No.: 997

[22] Filed: Jan. 3, 1979

[30] Foreign Application Priority Data

Jan. 10, 1978 [GB] United Kingdom ............... 823/78

[51] Int. Cl.² ................. F16D 1/00; F16D 3/00; F16G 11/00
[52] U.S. Cl. .............................. 403/219; 403/49
[58] Field of Search ............ 403/217, 219, 187, 189, 403/406, 407, 409, 49, 21, 358

[56] References Cited

U.S. PATENT DOCUMENTS

| | | | |
|---|---|---|---|
| 467,343 | 1/1892 | Douglas | 403/358 |
| 3,053,357 | 9/1962 | Stanger | 403/21 |

FOREIGN PATENT DOCUMENTS

| | | | |
|---|---|---|---|
| 1416339 | 4/1967 | France | 403/122 |
| 1523724 | 9/1978 | United Kingdom | 403/49 |

*Primary Examiner*—Wayne L. Shedd
*Attorney, Agent, or Firm*—Cushman, Darby & Cushman

[57] ABSTRACT

Three elongate members such as rods or tubes forming mutually perpendicular uprights transoms and ledgers in a scaffolding structure are interconnected by engagement of a bracket carried at one end of a first (horizontal) member in a socket provided in a second (upright) member, a third horizontal member being engaged between the end and the second member and retained in position by a wedge element. The wedge element is jammed in position by tightening a clamping nut, and use may be made of standard pipes such as scaffolding tubes.

6 Claims, 8 Drawing Figures

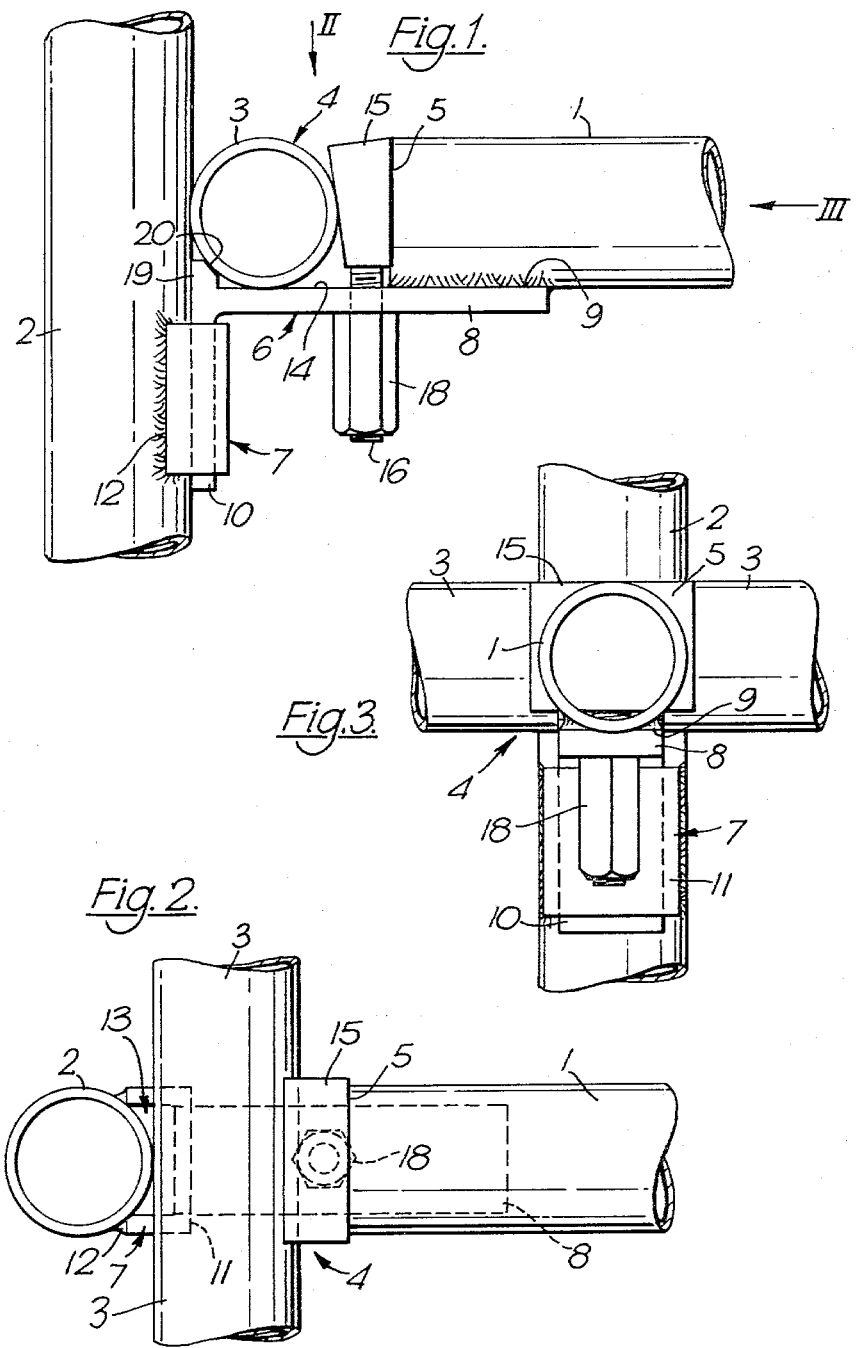

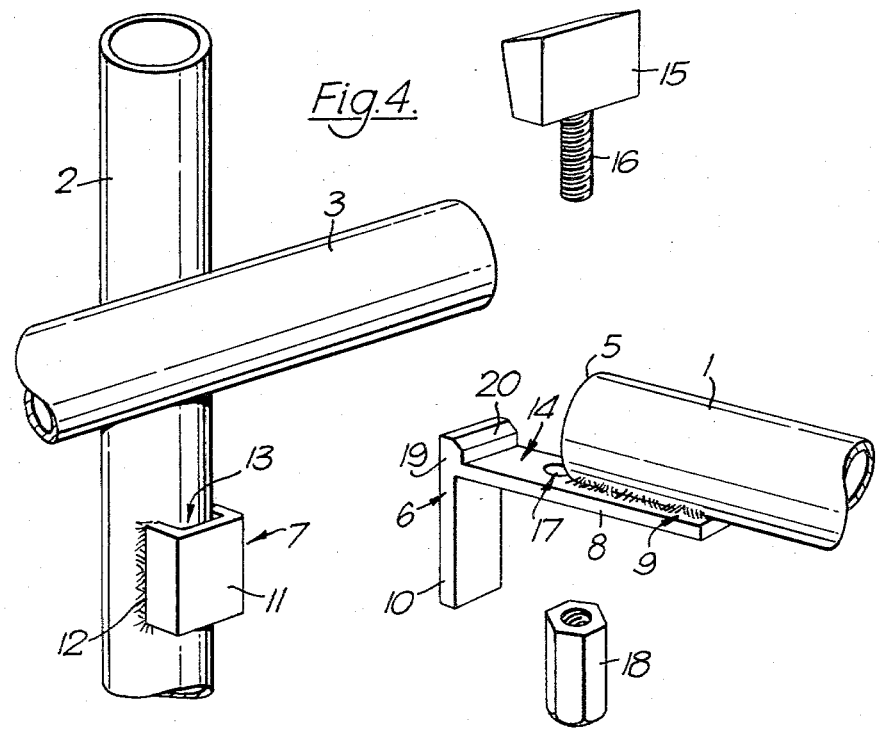
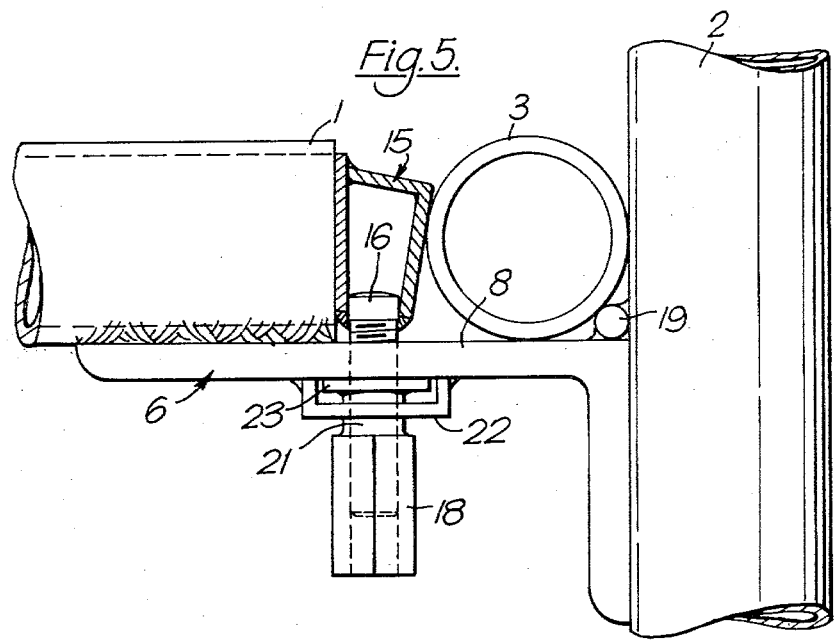

U.S. Patent    Oct. 7, 1980    Sheet 3 of 3    4,226,551
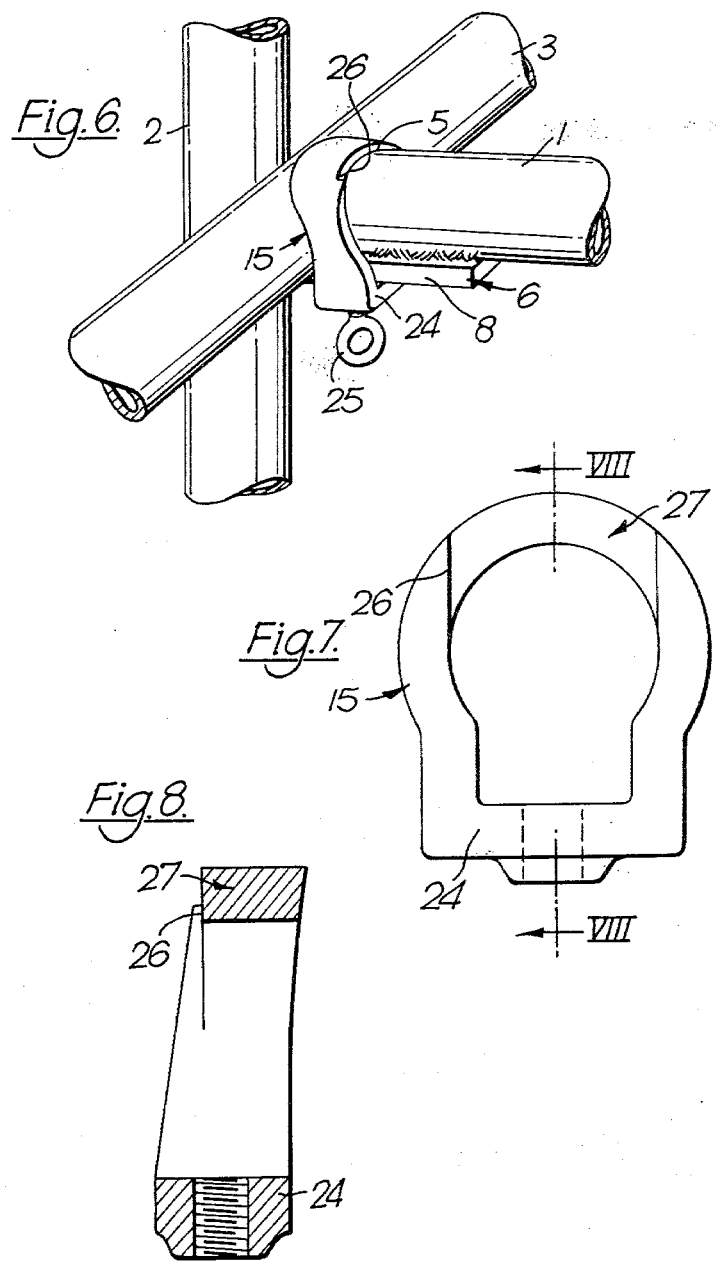

CONNECTOR SYSTEM FOR ELONGATE MEMBERS

DESCRIPTION

The present invention relates to a system for interconnecting three elongate members, such as rods or tubes.

The interconnection of elongate members is required to form many structures, especially load-bearing structures such as scaffolding, which have to provide a stable but relatively light load-bearing framework. Accordingly, a large number of systems have been devised for connecting such members but each system has its own problems and disadvantages. For example, in one commonly used scaffolding system, each pair of crossed scaffolding poles is connected by individual connectors, two connectors being required at each junction of three poles. Although the standardisation of parts allowed by such a system means that initial costs can be kept low, the erection of such scaffolding systems requires considerable time and care and hence considerable labour costs to provide a stable framework and it has also been found that the losses of connectors, which are releasable from the framework, are fairly high. Other systems have been devised in which the scaffolding poles themselves are adapted to interconnect with each other, thereby obviating the need for releasable connecting pieces and facilitating the connection of three pipes at one junction. Until now, however, such systems have involved the manufacture of different pipe units specifically adapted for use as the various parts of a scaffolding system, that is, for use as transoms, ledgers or uprights, with consequent increase in the initial cost and lack of flexibility, in use.

The object of the present invention is to provide a connector system for interconnecting three elongate members at a single junction, which provides a simpler connection than a system requiring two separate connectors at each such junction and which can be made more cheaply or conveniently than comparable known connector systems. It is envisaged that such a connector system will be of use particularly, but not exclusively, for the erection of scaffolding.

According to the present invention there is provided a connector system for interconnecting three elongate members, comprising: a support bracket carried at one end of a first of the elongate members and engageable with a second of the elongate members to support the first member therefrom, the bracket having a bearing face for engagement by the third member when located between the second member and the said one end of the first member and a wedge element engageable between the third member when so located, and the said one end of the first member to wedge the third member in position.

The support bracket may be adapted to support the first elongate member with its longitudinal axis at any desired angle to the longitudinal axis of the second member, although for most purposes the longitudinal axis of the first and second members would be mutually perpendicular. Similarly, the third elongate member may be supported with its longitudinal axis at any desired angle to the axis of the first and the second members, although it would most likely be perpendicular to the least one of these.

In use as part of a scaffolding framework, such connector systems may be employed at each junction of an upright with a ledger, that is, a scaffolding pole extending horizontally and parallel to the wall against which the scaffolding is erected, and a transom, that is a pole extending perpendicular to the wall. Since the transoms normally extend between two vertical uprights, each transom would preferably comprise the said first member, and would be provided with a support bracket at each end for engagement with a respective upright to support the transom with its axis horizontal, each upright comprising a said second member. The ledgers, therefore, each comprise a said third member and may be rested on respective support brackets of two or more aligned connector systems and wedged in position to complete the scaffolding framework. The ledgers of a scaffolding system in common use thus require no adaptation for use with a connector system according to the invention.

Retaining means are preferably provided for constraining the wedge element against movement axially of the third member, in this case the ledger, to help prevent the wedge element from being dislodged during use of the scaffolding.

The support bracket of a connector system according to the invention may, for example, be provided with a clamp which can grip an upright of a scaffolding system, either at any point along the length of the upright or at one of a plurality of predetermined positions, defined for example, by a projection or detent formed on or in the upright, respectively. In a preferred embodiment of the invention, however, the support bracket is provided with a lug which can be engaged in a cooperating eye, slot, pocket or other anchorage formed on or attached to the second elongate member. Although the second elongate member must be adapted by the provision of such anchorages, the anchorages may simply be in the form of pockets welded to existing scaffolding poles to reduce manufacturing costs. The support brackets may also be welded to the end of existing transoms and may simply comprise "L"-shaped plates, the free ends of which may be hooked into slots in respective anchorages to support the transoms. Such a hook-type connection would not only be cheaper to provide than a clamp, but would also be much quicker and easier to engage and would be safer, in use, since the proper location of the bracket is predetermined and no reliance is placed on the correct tightening of a nut or other clamping mechanism.

The wedge element of the connector system according to the present invention may be hammered into position between the third member, in this case the ledger, and the end of the first member, that is, the transom, in which case the retaining means may, for example, comprise lugs, provided at the end of the transom or on the support bracket which project one on either side of the wedge element, in its position of use, to retain the wedge element therebetween. Alternatively, a releasable screw-threaded retaining bolt may, for example, be provided which passes through an aperture in the support bracket and screwed into a cooperating screw-threaded bore hole in the wedge to retain the wedge in position. In a preferred embodiment of the invention, however, the wedge element is provided with a connector system in which the wedge element is provided with a screw-threaded retaining bolt which passes through an aperture in the support bracket and is engaged by a nut so that tightening of the nut against the bracket draws the wedge element towards the bearing face weding the said element between the third member and the end of the first member to retain the third member in position, the bolt also acting as the said retaining means for the wedge element. The nut may have a cylindrical waist which is freely located in a retaining plate attached to the bracket to render the nut captive on the bracket.

In use of a connector system according to the invention with circular cross-section elongate members, for example, with scaffolding poles as described above, the third elongate member, when wedged in position, contacts the second elongate member over a very small contact area. In normal use of a scaffolding system this is sufficient to maintain the stability of the connections but under conditions of high stress, for example under excessive loading or in high winds, the scaffolding poles tend to twist relative to each other and such connections may be broken. In a preferred embodiment of the invention, therefore, for use with circular cross-section elongate members, an abutment face is provided either on the bracket or on the second member, which the third member abuts, in use of the system, at least when twisted out of its correct position to help prevent further twisting and breaking of the connection.

In one embodiment of the invention the wedge element comprises a collar having a retaining part which fits over the bracket and a wedge part which is engageable between the third member and the said one end of the first member, the axis of the collar being substantially parallel to that of the third member. A screw-threaded clamping bolt may be threaded in the retaining part and engage a face of the bracket opposite the bearing face, so that upon tightening of the bolt against the bracket the wedge part of the collar is drawn between the third member, and the said one end of the first member. The collar is preferably capable of being fitted over the said end of the first member, the face of the collar which faces towards the first member having a radial groove in the portion of the collar remote from the bearing face, such that part of the said end of the first member engages in said groove when the collar is forced between the third member and said end of the first member, the grooved portion constituting the wedge part of the collar and having in axial section an axial thickness which tapers radially towards the retaining part of the collar.

Although the connector system according to the invention is of particular use for scaffolding systems, it may be used with any framework requiring the interconnection of three elongate members, whether of circular, square or other cross section, in which one member terminates at the junction. It is envisaged, for example, that the present connector system may be of use for connecting frame members for supporting shelves.

The invention will now be more particularly described by way of example, with reference to the accompanying drawings, in which:

FIG. 1 is a side elevational view of a connector system according to one embodiment of the invention in use as part of a scaffolding system;

FIG. 2 is a plan view taken on Arrow II of FIG. 1;

FIG. 3 is an end elevation taken on arrow III of FIG. 1;

FIG. 4 is an exploded perspective view of the connector system of FIG. 1;

FIG. 5 is a side elevational view similar to FIG. 1 illustrating a variant of the embodiment shown in FIG. 1;

FIG. 6 is a perspective view illustrating a connector system according to another embodiment of the invention;

FIG. 7 is an end view of the wedge element employed in the connector system of FIG. 6, and FIG. 8 is a cross sectional view of the wedge element taken on line VIII—VIII in FIG. 7.

The same reference numerals are used in all the drawings to indicate the same corresponding component parts.

Referring to FIGS. 1, 2 and 3 of the drawings, portions of three tubular scaffolding poles 1, 2, 3, forming part of a scaffolding system are shown interconnected by a connector system according to the invention, generally indicated 4. The pole 2 comprises an upright of the scaffolding system and is located with its longitudinal axis substantially vertical, the pole 1 comprises a transom, and extends substantially horizontally and the pole 3 comprises a ledger and extends substantially horizontally and perpendicular to the transom 1.

The transom 1 is provided at one end with a support bracket 6 which forms part of the connector system 4 and engages with an anchorage 7 carried by the upright 2 to support the transom 1 from the upright 2, with the end 5 spaced from the upright. To this end the bracket 6 is in the form of an "L"-shaped plate, the longer arm 8 of which is welded to the under surface of the transom 1 along its longitudinal edges 9 such that the arm 8 projects parallel to the longitudinal axis of the transom and beyond the adjacent end face 5 of the transom 1, the shorter arm 10 extending downwardly from the free end of the arm 8.

The anchorage 7 is of channel-section, having a plate 11 extending longitudinally of the upright 2 and longitudinal edge-flanges, the free edges 12 of which are welded to the upright 2. The plate 11 is spaced from the upright 2 to form an open-ended slot 13 in which the arm 10 of the bracket 6 is engaged to support the transom 1.

The ledger 3, as shown in FIGS. 1 to 3, is supported on an upper bearing face 14 of the arm 8 of the support bracket 6 between the upright 2 and the end face 5 of the transom 1. The ledger 3 is retained in this position by means of a wedge element 15 which is a force fit in the space between the ledger 3 and the end face 5.

To facilitate the forcing of the wedge element into position, the wedge element 15 is provided on its lower, narrower face with a screw-threaded bolt 16 which, in use, is located in a throughbore 17 in the arm 8 of the bracket 6. An internally screw-threaded nut 18 is screwed on to the bolt 16 and engages with the lower face of the arm 8 such that tightening of the nut 18 against the arm 8 draws the wedge element 15 tightly into position, pressing the ledger 3 against the upright 2, and the bearing face 14 of the arm 8 to hold the ledger firmly in position. The nut 18, as shown, is only slightly shorter than the pin 15 so that it encloses the pin 15, in use.

In this embodiment a nut 18 is provided which requires tightening with a spanner or wrench for safety reasons; a wing nut could alternatively be provided but this would be prone to inadvertent slackening, for example if knocked accidentally, thus weakening the scaffolding structure.

As a further safety feature, the bracket 6 is provided with an upstanding stop 19 at the free end of the arm 8, abutting the upright 2. The stop 19 has an angled abutment face 20 facing the end 5 of the transom 1 and substantially tangential to the adjacent surface of the ledger 3, in its position of use.

The stop 19 is of such a size that the ledger 3 would not normally abut the face 20, but should the ledger start to twist out of its normal position, shown in FIGS. 1 to 3, it would then abut one end of the face 20 and further twisting would be resisted.

Referring to FIG. 4 of the drawings, the scaffolding poles 1, 2 and 3 and parts of the connector system 4 are shown separated, for clarity.

In the drawings only a portion of a scaffolding system is shown. In practice each transom of the system would be provided with a bracket 6 at each end for engagement with a respective anchorage 7 carried by a respective upright. Each ledger would extend between at least two uprights and possibly three or more uprights, being connected to an upright and a transom by respective connector systems 4 at each junction. Each upright of the system would be provided with several anchorages 7 spaced at convenient intervals along its length.

The connector system illustrated in FIG. 5 differs from that shown in FIG. 1 in that the wedge element 15 is fabricated in sheet metal and is of hollow box construction. The wedge element 15 is welded to one end of a retaining bolt 16 which passes through the bracket 6 and engages in a nut 18. The nut 18 has a cylindrical waist 21 which is located freely in an aperture in a retaining plate 22 welded to the underside of the bracket 6, the waist 21 adjoining an external flange 23 at one end of the nut 18. The flange 23, which may comprise a washer welded to one end of the nut is trapped between the plate 22 and the bracket 6, rendering the nut 18 captive on the bracket.

In the embodiment of FIG. 5 the stop 19 at the free end of the bracket arm 8 consists of a length of circular section steel rod welded to the arm 8.

In the embodiment of FIGS. 6 to 8 the wedge element comprises a sheradized mild steel collar 15 having an internal diameter such that it can slide over the transom pole 1. The collar 15 is formed integrally with a retaining part 24 which fits over the bracket 6 and which receives a screw threaded clamping bolt 25 engageable with the lower face of the bracket arm 8 opposite the upper bearing face 14.

The collar 15 is located between the ledger pole 3 and the adjacent end face 5 of the transom pole 1 with the axis of the collar 15 substantially parallel to the axis of the transom pole 1. The face of the collar 15 which faces towards the transom pole 1 has a shallow radial groove 26 extending from the inside to the outside surface of the collar in the portion thereof remote from the retaining part. The groove 26 has a width equal to the internal diameter of the collar 15 (FIG. 7) so that the end face 5 of the transom pole 1 can engage in groove 26 when the collar 15 is drawn between the ledge pole 3 and the end face 5 of the transom pole 1 by tightening of the clamping bolt 25.

The portion of the collar 15 formed with the groove 26 has an axial section (FIG. 8) which tapers in axial thickness radially towards the retaining part 24 of the collar, this portion in effect constituting a wedge part 27. It will be seen from FIG. 8 that the end face of the collar 15 which faces towards the transom pole is inclined to the axis of the collar so that the sides of the collar partly enclose the sides of the transom pole 1 when an upper portion of the end face 5 of the pole 1 engages the wedge part 27 of the collar. The end face of the collar 15 which faces towards the ledger pole 3 is also inclined to the axis of the collar 15 in the region of the wedge part 27 to enable the wedge part 27 to engage an upper surface portion of the ledger pole 3, with a clamping force having a downward component directed towards the bracket 6. An advantage of the illustrated connector system according to the invention is that it can be employed with scaffolding poles in current use, the uprights being adapted by having anchorages welded to them at appropriate intervals and the transoms being adapted by the provision of appropriate brackets; the ledgers need no adaptation whatsoever.

A further advantage of the connector system is that it allows a simple solution to the problem of fixing toe boards, that is, upstanding boards provided along the edges of a platform of a scaffolding system, a platform being formed by several planks placed side by side and extending between, and supported by, at least two transoms. Such toe boards are an important safety feature of scaffolding systems but are often omitted because of the time involved in anchoring them securely to the uprights. The present connector system, however, lengthens the transoms by approximately 1½ inches, and sufficiently to accommodate a toe board between an upright and the planks forming the platform, the transoms and planks being of standard size such that four planks can normally be placed side by side on each transom. A toe board may thus simply be rested on edge on each ledger, on either side of a platform, and may be clamped between the uprights and the outer plank of the platform, no other fastenings being required.

A support bracket 6 could alternatively be provided at the end of a ledger 3 for engagement with an anchorage carried by an upright 2; a transom 1 would then be rested on the bracket and wedged in position at a common junction of the three poles.

I claim:

1. A connector system for interconnecting three elongate members comprising:
a first elongate member;
a support bracket attached at one end of said first elongate member;
engagement means on said bracket engaged with a second elongate member; and
a bearing face on said bracket engaged by a third elongate member when the latter is located between the second member and the said end of the first member,
wherein the improvement comprises:
a collar element receiving the one end of said first member and having a retaining part which fits over the bracket and a wedge part which is engaged between said third member and the said one end of the first member, the axis of the collar being substantially parallel to that of the first member, and
a screw-threaded clamping bolt threaded in the retaining part and engaging the opposite face of the bracket from said bearing face,
whereby upon the tightening of the bolt against the bracket the wedge part of the collar is drawn between the third member and the said one end of the third member to clamp said members relatively to each other.

2. A scaffolding system comprising first, second and third elongate scaffolding members and connecting means interconnecting said members, said connecting means comprising:
a support bracket attached at one end of said first elongate member;

engagement means on said bracket engaging said second elongate member to support the first member from the second member;

a bearing face on said bracket engaged by said third elongate member, the latter being located between the second member and one end of the first member; and wherein the improvements consist in:

a collar element receiving the one end of said first member and having a retaining part which fits over the bracket and a wedge part which is engageable between said third member and the said one end of the first member, the axis of the collar being substantially parallel to that of the first member, and a screw-threaded clamping bolt threaded in the retaining part and engaging the opposite face of the bracket from said bearing face, whereby upon the tightening of the bolt against the bracket the wedge part of the collar is drawn between the third member and the said one end of the first member to clamp said members relatively to each other.

3. A connector system as defined in claim 2 wherein the face of the collar element which faces towards the first member has a radial groove in the wedge part such that part of the said end of the first member engages in said groove when the collar element is forced between the third member and said end of the first member, the grooved portion having in axial section an axial thickness which tapers radially towards the retaining part of the collar element.

4. A scaffolding system as claimed in claim 2 wherein the first, second and third elongate members are of circular cross-section and including an abutment face on the bracket which the third member abuts, in use of the system, at least when twisted out of its correct position, to resist angular movement of said third member.

5. A scaffolding system as claimed in claim 2, wherein each elongate member comprises a scaffolding pole.

6. A scaffolding system as claimed in claim 5 wherein the first member comprises a transom, the second member comprises an upright and the third member comprises a ledger.

* * * * *